United States Patent
Brandl et al.

(10) Patent No.: US 8,596,356 B2
(45) Date of Patent: Dec. 3, 2013

(54) METHOD OF PRODUCING SYNTHESIS GAS BY THE UNDERGROUND GASIFICATION OF COAL FROM A COAL SEAM

(75) Inventors: Andreas Brandl, Houston, TX (US); Dale R. Doherty, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 279 days.

(21) Appl. No.: 12/914,890

(22) Filed: Oct. 28, 2010

(65) Prior Publication Data

US 2012/0103611 A1    May 3, 2012

(51) Int. Cl.
  *E21B 33/14* (2006.01)
  *E21B 43/243* (2006.01)
  *C09K 8/467* (2006.01)

(52) U.S. Cl.
  USPC .......... 166/261; 106/713; 106/814; 106/819; 166/292; 507/269

(58) Field of Classification Search
  None
  See application file for complete search history.

(56) References Cited

U.S. PATENT DOCUMENTS

| | | | |
|---|---|---|---|
| 3,180,748 A * | 4/1965 | Holmgren et al. | 428/34.4 |
| 3,219,110 A * | 11/1965 | Martin et al. | 166/256 |
| 3,331,438 A * | 7/1967 | Slusser | 166/261 |
| 3,372,754 A * | 3/1968 | McDonald | 166/59 |
| 3,507,332 A * | 4/1970 | Shell et al. | 166/292 |
| 4,019,577 A * | 4/1977 | Fitch et al. | 166/259 |
| 4,102,397 A * | 7/1978 | Terry | 166/259 |
| 4,234,042 A * | 11/1980 | Kirkpatrick et al. | 166/261 |
| 4,441,554 A * | 4/1984 | Grupping | 166/261 |
| 4,648,450 A | 3/1987 | Gash et al. | |
| 5,167,710 A | 12/1992 | Leroux et al. | |
| 5,226,961 A | 7/1993 | Nahm et al. | |
| 6,729,405 B2 * | 5/2004 | DiLullo et al. | 166/292 |
| 2004/0211338 A1 * | 10/2004 | Francis | 106/675 |
| 2005/0133222 A1 | 6/2005 | Di Lullo Arias et al. | |
| 2008/0066652 A1 | 3/2008 | Fraser et al. | |
| 2008/0066654 A1 | 3/2008 | Fraser | |
| 2008/0066655 A1 | 3/2008 | Fraser | |
| 2008/0202752 A1 | 8/2008 | Lopez et al. | |
| 2009/0139719 A1 | 6/2009 | Luo et al. | |

FOREIGN PATENT DOCUMENTS

| | | |
|---|---|---|
| CN | 1868953 A | 11/2006 |
| GB | 1493016 A | 11/1977 |
| GB | 1508866 A | 4/1978 |
| IN | 2065/DEL/2004 | 8/2006 |

OTHER PUBLICATIONS

Suyan, et al.; "Novel Cement Composition for Completion of Thermal Recovery (ISC) Wellbores"; SPE/IADC 101848; SPE/IADC Indian Drilling Technology Conference and Exhibition held in Mumbai, India, Oct. 16-18, 2006; 6 pages.

(Continued)

*Primary Examiner* — George Suchfield
(74) *Attorney, Agent, or Firm* — John Wilson Jones; Jones & Smith, LLP

(57) ABSTRACT

Synthesis gas is more effectively produced from the underground gasification of coal from a coal seam when the casing lining is cemented with a cementitious slurry containing a cementitious material, graphite and an aluminum silicate, such as metakaolin. The cementitious slurry of the cement mix sets as a cement sheath at bottomhole static temperatures less than or equal to 65° C. The set cement may withstand extreme dry heat temperatures which are greater than or equal to 800° C.

20 Claims, 1 Drawing Sheet

(56) References Cited

OTHER PUBLICATIONS

Stiles; "Effects of Long-Term Exposure to Ultrahigh Temperature on the Mechanical Parameters of Cement"; IADC/SPE 98896; IADC/SPE Drilling Conference held in Miama, Florida, U.S.A. Feb. 21-23, 2006; 11 pages.

Morsy, et al.; "Effect of Fire on Microstructure and Mechanical Properties of Blended Cement Pastes Containing Metakaolin and Silica Fume"; 11DBMC International Conference on Durability of Building Materials and Components; Istanbul, Turkey, May 11-14, 2008, 9 pages.

Suyan et al., "Novel Cement Composition for Completion of Thermal Recovery (ISC) Wellbores", SPE/IADC 101848, SPE/IADC Indian Drilling Technology Conference and Exhibition, Mumbai, India, Oct. 16-18, 2006, 6 pages.

* cited by examiner

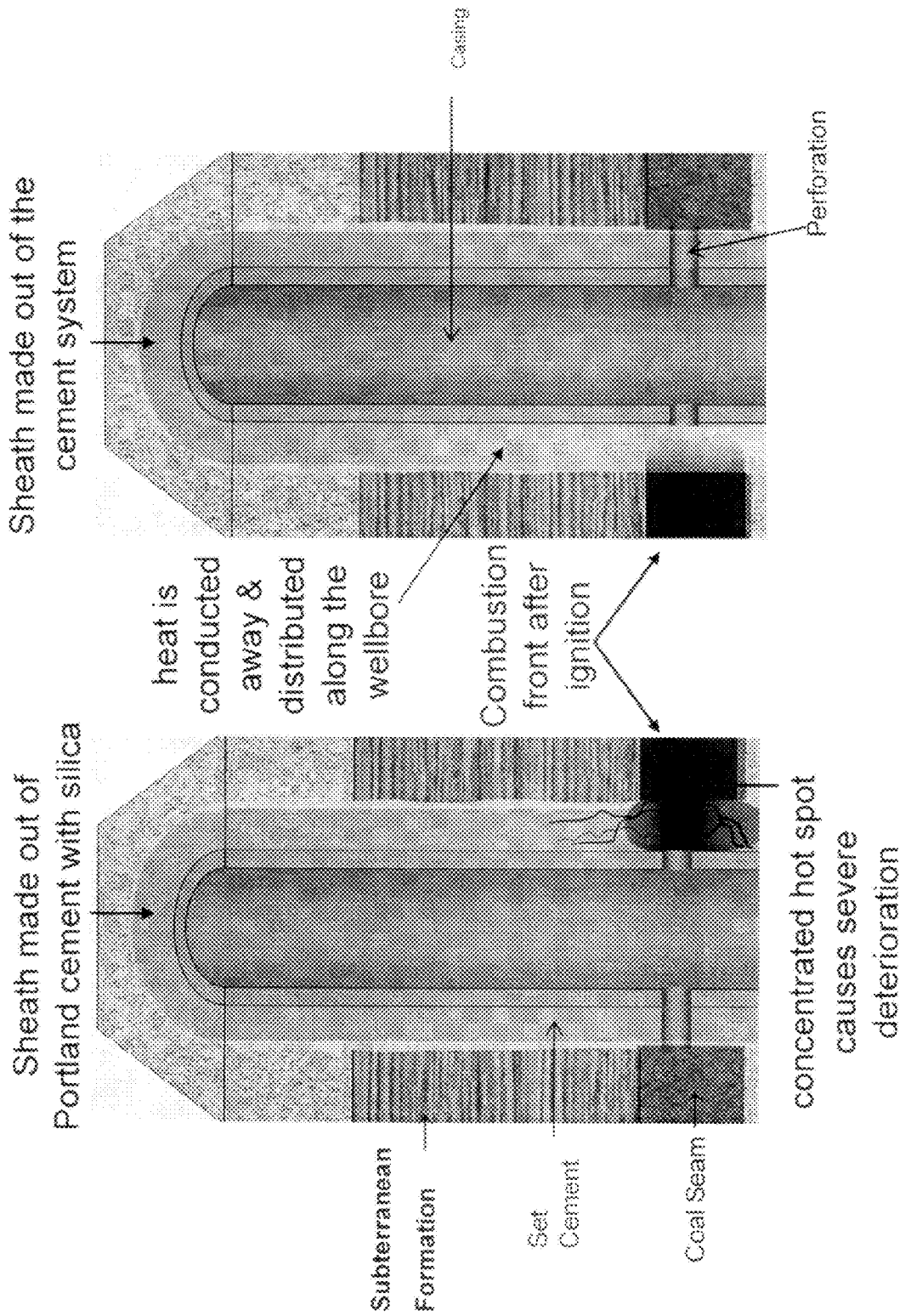

METHOD OF PRODUCING SYNTHESIS GAS BY THE UNDERGROUND GASIFICATION OF COAL FROM A COAL SEAM

FIELD OF THE INVENTION

Application of a cementitious slurry containing graphite and an aluminum silicate in the production of synthesis gas by underground coal gasification is disclosed.

BACKGROUND OF THE INVENTION

Underground coal gasification (UCG) is a technique for extraction of energy contained within a coal seam. This method is a viable alternative to conventional mining by reducing the surface footprint, emission, and energy costs. In addition, UCG is useful in harvesting of energy in coal seams unsuitable for conventional mining techniques. UCG, in its simplest form, involves drilling a production well and an injector well from the surface into an existing coal seam. These are linked together horizontally by drilling, fracturing, or combustion links. Once the wellbore has been drilled, casing is lowered into the wellbore. A cementitious slurry is then introduced into the wellbore and is pumped down the inside of the pipe or casing and back up the outside of the pipe or casing through the annular space between the exterior of the casing and the borehole. The cement slurry is then allowed to set and harden to hold the casing in place. This effectively seals the subterranean zones in the formation, called "zonal isolation" and supports the casing.

Once drilling and cementing of the wells are complete, the coal is ignited underground, air or oxygen-enriched air (and sometimes also water) is then introduced through an injector well. The air reforms with the combustion materials (coal) and forms a synthesis gas (syngas) containing carbon monoxide, hydrogen and methane (as a minor component). The combustion front consumes the coal seam. The syngas moves under pressure through the coal seam to the production well, where it travels uphole to the downstream facility. The stream of syngas coming through the producing well to the surface can be used to drive a turbine and generate electricity. Furthermore the syngas is used as a chemical feedstock or as a fuel for power generation.

UCG offers several inherent advantages over conventional mining, including avoidance of the environmental impact which occurs during strip mining of coal, avoidance of problems of spoil banks, slag piles and acid mine drainage, reduction in emissions, lower energy costs and avoidance of safety and health hazards related to the underground mining of coal.

In many areas, UCG wells are very shallow and the majority of the coal seams are located very near the surface. In such instances, the wells may be drilled such that they penetrate the coal seam by only a few meters. As such, only a small portion of the cement sheath is exposed directly to the combustion front.

Since coal typically resides at shallow depths, it is often necessary to introduce into the wellbore a cementitious slurry that sets at relatively low bottomhole static temperatures. Typically, it is desired that the cementitious slurry set at low bottomhole static temperatures. In addition, it is important that the set cement has the ability to withstand the extreme temperatures of the advancing combustion front. Typically, the temperatures of the combustion front are in excess of 800° C. While Portland cement has been used in geothermal wells in which production temperatures can reach greater than 380° C., such cements typically disintegrate around 450° C.

More recently, cements containing calcium aluminate phosphate (CaP) have been proposed for the cementing of the casing strings for UCG applications. Although the CaP cement can typically withstand the temperatures generated by the combustion front and the high production temperatures, it is not ideally suited for everyday cementing operations: Common cementing additives used for Portland cement based systems are unsuitable with CaP cement making it difficult to adjust reliable slurry performances (such as thickening and setting times, fluid loss and free water controls, rheologies) for CaP cement systems. Also, contamination of CaP with Portland cement residues in a cementing unit causes unpredictable setting times. Therefore CaP systems must be handled separately, which requires advanced planning. The expensive logistics and manufacturing, as well as the fact that CaP cements are not available everywhere, significantly increase their costs as compared with Portland cements. The cementing of wells with CaP cements have caused setting failures at the low static temperatures associated with the shallow depth of coal beds, thereby causing failure or incomplete establishment of zonal isolation within the cemented wellbore of the subsurface formations. This causes the undesirable result of gas communication with the surface. Then, costly remedial work is required and lost hours of non-productive time are the consequence.

Alternative cementitious materials have been sought which set at relatively low bottomhole static temperatures and which provide zonal isolation along the majority of the wellbore at average production temperatures. In addition, cementitious materials capable of maintaining integrity of the cement sheath at the combustion front at high temperatures are also desired. Ideally the cementitious materials should be based on Portland cement for which reliable slurry performances for a given wellbore condition can be adjusted with typical chemical additives to achieve a good primary cement job. Besides economics, logistics, and operations are simplified for a Portland cement based system in comparison to a CaP based system.

SUMMARY OF THE INVENTION

A cement mix containing a cementitious material, graphite and an aluminum silicate is useful in the cementing of casing in a production and/or injection well in UCG. A cementitious slurry of the cement mix may be pumped through standardized pumping equipment and easily sets as a cement sheath at low bottomhole static temperatures characteristic of shallow coal beds. Zonal isolation may be created between the burning coal reservoir in the ground and the surface.

In addition to the cementitious material, graphite and aluminum silicate, the cement mix or cementitious slurry may further contain other additives for dissipating generated heat during UCG.

The cement mix and cementitious slurry containing the cement mix is compatible with common Portland cement additives and eliminates the need for purchasing special equipment and chemicals, such as that used for high alumina phosphate cement based systems.

The density of the cementitious slurry is normally between from about 14.0 to about 17.0 pounds per gallon (ppg). but can be increased with weighting agents up to 23.0 ppg or decreased with light weight additives or foaming down to 7.0 ppg.

The set cement is further capable of withstanding extreme dry heat temperatures greater than or equal to 800° C. Such high temperatures are characteristic of the advancing combustion front of an ignited coal seam when syngas is produced.

The set cement serves as a thermal conductor conducting the heat from the combustion front away from the cement shoe and distributing the heat along the annulus of the wellbore at higher rate until it gets finally lost to the surrounding formation as it makes its way to the surface. Further, the set cement provides zonal isolation of the formation.

The set cement serves as thermal conductor and lowers the temperature of the produced syngas during its way along the wellbore for easier handling and processing at the surface.

BRIEF DESCRIPTION OF THE DRAWINGS

In order to more fully understand the drawings referred to in the detailed description of the present invention, a brief description of each drawing is presented, in which:

FIG. 1 is a cross-section of a production well for UCC showing the coal seam, cement sheath and casing during combustion and demonstrates the durability from high heat of a combustion front during UCC of the cement sheath made from the high temperature cement mix described herein.

DETAILED DESCRIPTION OF THE PREFERRED EMBODIMENTS

A cementitious slurry containing a high temperature cement mix is introduced into the wellbore and may be used to cement the casing strings of both the injection and production wells which have been drilled into an existing coal seam. After cementing of the casing, the coal is ignited underground. Air and water are then introduced through the injector well. The air reforms with the combustion materials and forms the synthesis gas (syngas). The syngas contains carbon monoxide, hydrogen and methane (as a minor component). The syngas then moves under pressure through the coal seam as a combustion front to the production well, where it travels uphole for use downstream.

The high temperature cement has particular usefulness in the treatment of coal seams at shallow depths. Such coal seams are characterized by low bottomhole static temperatures less than or equal to 150° C., in some cases less than or equal to 65° C. and in other cases less than or equal to 38°, and in some cases less than or equal to 30° C. In addition to being set at such low temperatures, the high temperature cement described herein further is capable of withstanding the extreme temperatures (dry heat) of the advancing combustion front, which can exceed 800° C. and which is often greater than 1000° C. Further, the high temperature cement is capable of maintaining zonal isolation at least to the combustion front.

The cement mix described herein, when formulated into a hydraulically-active, cementitious slurry and set in the wellbore forms a cement sheath. FIG. 1 compares the beneficial behavior of the set high temperature cement described herein with a conventional set Portland cement containing silica after ignition of the well. The right side of FIG. 1 illustrates a cement sheath composed of the set cement mix described herein. As illustrated, heat from the combustion front of the produced syngas is conducted away from the cement shoe and is distributed along the cement sheath in the wellbore. As the syngas proceeds to the surface, the heat from the combustion front is lost into the surrounding formation at a high rate. The temperature of the produced syngas decreases as the product travels upwards within the wellbore. The left side of FIG. 1 compares a cement sheath composed of the conventional Portland cement system where concentrated hot spots cause severe deterioration. Since the sheath composed of the cement mix described herein can withstand significant changes in temperature (such as those affiliated with contacting of the wellbore with direct flames, combustion and syngas production in the UCG process), the set cement provides a sufficient barrier at the combustion front at temperatures equal to or in excess of 800° C. As such, the successful isolation at the combustion front provides an effective barrier so that catastrophic failure of the sheath does not cause a chain reaction and propagate up the cemented annulus.

The high temperature cement system described herein tolerates the elevated dry temperatures at the combustion front and maintains compressive strength in normal API compressive strength (CS) tests.

Further, use of the cement mix defined herein results in a reduction in the temperature flow of the produced gas stream. For instance, when compared to a treatment of a well cemented with CaP cement, the same well treated with the cement mix defined herein delivered syngas to the surface which was about 45° C. to about 60° C. cooler. Such syngas is easier to process than the syngas obtained from a well cemented with CaP cement.

In addition to exhibiting high thermal heat conductivity (even with cementitious slurries having reduced water content) and a cement sheath exhibiting superior mechanical properties, including compressive strength, the high temperature cement mix is almost less than half the cost of CaP cement. Further, in light of its superior mechanical properties, internal stresses in the set cement are reduced.

The cement mix contains a cementitious material, graphite and an aluminum silicate.

A variety of cementitious materials may be used in the cement mix including those comprised of calcium, aluminum, silicon, oxygen and/or sulfur which set and harden by reaction with water. Hydraulically active cementitious materials, suitable for use in the cementitious slurry, include materials with hydraulic properties, such as hydraulic cement, slag and blends of hydraulic cement and slag (slagment), which are well known in the art. As used herein, the term "hydraulic cement" refers to any inorganic cement that hardens or sets due to hydration. As used herein, the term "hydraulically-active" refers to properties of a cementitious material that allow the material to set in a manner like hydraulic cement, either with or without additional activation. Hydraulic cements, for instance, include Portland cements, high alumina cements, phosphate cements, pozzolan cements, fly ash cements, silica fume and the like. Any of the oil well type cements of the class "A-H" and "J" as listed in the API Spec 10A, (22nd ed., January 1995 or alternatively ISO 10426-1), are suitable. Especially preferred is Portland cement, preferably an API Class A, C, G or H cement. Alternatively, the Portland cement may be a Type I, II, III or V ASTM construction cement. The cementitious material may further include a mixture of two or more components selected from Portland cement, fly ash, slag, silica fume, gypsum, limestone and bentonite.

Typically, between from about 10 to about 70, preferably between from about 20 to about 65, most preferably from about 35 to about 65, weight percent of the cement mix is Portland cement or the referenced mixture.

The aluminum silicate is typically comprised of $SiO_2/Al_2O_3/Fe_2O_3$. Most typically the aluminum silicate is kaolin, calcined kaolin or kaolinite (metakaolin) or mixtures thereof. Such aluminum silicate may also be referred to as China Clay. Other suitable forms of aluminum silicate include, but are not limited to, halloysite, dickite, and nacrite, and mixtures thereof, as well as mixtures of these with materials with kaolin and/or metakaolin. The amount of aluminum silicate in the cement mix is typically between from about 5 to about 70 weight percent, preferably from about 8 to about 45 weight percent.

The amount of graphite in the cement mix is typically between from about 5 to about 70 weight percent, preferably from about 8 to about 45 weight percent.

The cement mix described provides a slurry with lower water content. For instance, a slurry having a desired density of 15 ppg requires a lower concentration of water to attain the desired density than a substantially similar slurry composed of a conventional cement mix.

The cementitious slurry, formulated from the cement mix, typically has a density in the range of from about 7 to about 23 pounds per gallon (ppg), more typically from about 11 to about 17, most typically from about 15.6 to about 16.6 ppg. In some instances, it is desirable to add a density weighting agent or a density reducing agent. For instance, when the density of the cementitious slurry is required to be above 17 ppg, it is necessary to add a density weighting agent. Suitable density weighting agents include ilmenite, manganese oxide, iron oxide, iron II oxide, ferrous-ferric oxide, ferrosilicon, specularite, ferrophosphorus, galena, iron arsenite, barium sulfate, and the like. Such density weighting agents increase the density of the cementitious slurry at reduced water content (over a substantially similar cementitious slurry containing a cement mix of the prior art). Further, when the density of the slurry is required to be below 14 ppg, it is necessary to add a density reducing agent or a foaming agent. Suitable density reducing agents include such lightweight additives include naturally occurring ceramic spheres called cenospheres or manufactured glass spheres. Such density reducing agents decrease the density of the slurry at reduced water content (over a substantially similar cementitious slurry containing a cement mix of the prior art). When present, the amount of density weighting agents or density reducing agents in the slurry is between from about 5 to about 150% BWOC.

The slurry may contain fresh water, salt water, formation brine or synthetic brine or a mixture thereof. Generally, the water is present in the slurry in an amount sufficient to form a slurry pumpable through standardized pumping equipment. As permeability of the set cement increases with increased water content, it is desirable to pump a cementitious slurry having the lowest water content possible in order to minimize permeability of the set cement. Generally, the amount of mixing water in the slurry may range from about 30 to 150 weight percent based upon the dry weight of cement and preferably is in the range of about 35 to 90 weight percent.

The cement mix and cementitious slurries of the invention may further include other additives commonly utilized in cement compositions and which are well known to those skilled in the art. For example, weighting agents, lightweight additives, fluid loss control additives, set retarders, plasticizer, set accelerators or activators, dispersing agents, extenders, foam preventers, etc. in such conventional amounts, for instance, of from about 0.1% to about 12% by weight of cement (BWOC) may be included, preferably from about 0.1 to about 2% BWOC.

Suitable additives for controlling fluid loss include polyvinyl alcohol, optionally with boric acid, hydroxyethyl cellulose, carboxymethyl hydroxyethyl cellulose, synthetic anionic polymers and synthetic cationic polymers. Such fluid loss control additives, when present, are typically a component of the cement mix, though it could be introduced into the cementitious slurry.

Suitable dispersants include polyacrylates, naphthalene sulfonic acid and the like.

Activators include solutions of Group IA and IIA hydroxides, such as sodium hydroxide, magnesium hydroxide and calcium hydroxide; sulfates, such as sodium sulfate; aluminates, such as sodium aluminate and potassium aluminate; carbonates, such as sodium carbonate; silicates; triethanolamine (TEA) and calcium chloride. Preferred activators are sodium silicates. Typical concentrations of activator range from about 0.05 gps to 3.5 gps dependent on application.

A plasticizing agent may further be used in the cement mix (or added directly to the slurry) to assist in control of the fluidity of the slurry. Specific examples of plasticizing agents include melamine sulfonic acid polymer condensation product, sodium polyacrylate, naphthalene sulfonic acid, sodium salt of naphthalene sulfonate formaldehyde condensate, sodium sulfonated melamine formaldehyde (SMF) and sulfonated-styrene maleic anhydride polymer.

The set retarder, when employed, should be chosen in order to allow sufficient thickening time of the slurry upon setting for proper placement in the annulus of the wellbore. Suitable set retarders include glucoheptonates, such as sodium glucoheptonate, calcium glucoheptonate and magnesium glucoheptonate; lignin sulfonates, such as sodium lignosulfonate and calcium sodium lignosulfonate; gluconic acids gluconates, such as sodium gluconate, calcium gluconate and calcium sodium gluconate; phosphonates, such as the sodium salt of EDTA phosphonic acid; sugars, such as sucrose; hydroxycarboxylic acids, such as citric acid; and the like, as well as their blends.

The cement mix may further contain a strength retrogression additive for limiting deterioration of the cement, loss of strength of the cement and increase permeability of the cement. Such additives include silica flour and crystalline silica such as coarse and fine grain crystalline and prevent the conversion of regular calcium-silicate-hydrate phases into alpha dicalcium silicate. The amount of strength retrogression additive typically added is that amount which is necessary in order to obtain a $CaO:SiO_2$ ratio of 1. Typically, the amount of strength retrogression additive in the cement mix is between from about 10% to about 80% BWOC, preferably from about 20 to about 50% BWOC.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units by weight of cement (BWOC) except as may otherwise be indicated.

EXAMPLES

Example 1

A cementitious slurry was prepared by mixing neat Class G Portland cement with 81.7% fresh water at room temperature. To the slurry was added 35% silica flour, 15% graphite, 12.5% metakaolin, 0.3 gallons per sack cement (gps) fluid loss additive, commercially available from BJ Services Company LLC as FL-66L+0.7% CD-31 (a cement dispersant available from BJ Services Company LLC). The resultant slurry, 15.6 ppg, was kept with occasional agitation. Standard API viscosity and a fluid loss test were conducted on the cement slurry. The "Thickening Time" represents the amount of time that the slurry remained in a liquid state and to reach 100 Bc.

Thickening Time to 100 Bc=2:40 hh:mm
API Free Water=0%
API Fluid Loss=64 cc/30 min The rheology readings, shown in Table 1, were taken on Fann 35 viscometer, at 38° C.:

TABLE I

| Rheometer RPM's | Initial Fann readings after mixing | Fann readings after 20 minutes conditioning at 38° C. |
|---|---|---|
| 600 | 300+ | 300+ |
| 300 | 270 | 261 |
| 200 | 190 | 185 |
| 100 | 105 | 102 |
| 60 | 67 | 66 |
| 30 | 38 | 37 |
| 6 | 12 | 12 |
| 3 | 9 | 9 |

Example 2

The cementitious slurry recited in Example 1 was prepared and placed into nine cylindrical curing vessels of 1 in. diameter×3 in. long and cured at 39° C. for 120 hours in a standard API water bath. This simulates pumping the cement slurry in the well and setting under the normal curing temperature until the coal seam is ignited. Once cured, the 1×3 in. cylinders were cut into 2-in. sections and squared off. Cylinders S-1, S-2 and S-3 were crushed immediately after 48 hours. Cylinders S-4 through S-9 were then placed into a 2 in. diameter×6 in. long cylinders along with enough water to cover the cylinders and 20 g silica flour. The cylinders were then placed into a muffle furnace and cured at 350° C. Cylinders S-4, S-5 and S-6 were removed from the furnace after 72 hours of exposure and allowed to cool slowly over 48 hours while submersed in water inside the testing vessel. After the 48 hour cooling period, the cylinders were removed and measured. None of the tests showed change in circumference or length. The same procedure was used for Cylinders S-7, S-8 and S-9 after they were exposed for 30 days. Compressive strength was obtained through API RP-10B destructive crush test. The results are set forth in Table II:

TABLE II

| | Sample Number | | | | | | | | |
|---|---|---|---|---|---|---|---|---|---|
| | S-1 | S-2 | S-3 | S-4 | S-5 | S-6 | S-7 | S-8 | S-9 |
| Mass (g) after 39° C. | 63.93 | 63.83 | 61.88 | 63.95 | 63.65 | 64.22 | 64.96 | 65.03 | 64.80 |
| Mass (g) after 350° C. | NA | NA | NA | 61.91 | 61.61 | 62.15 | 62.60 | 62.73 | 62.46 |
| CS (psi) 39° C. | 1925 | 1925 | 1635 | NA | NA | NA | NA | NA | NA |
| CS (psi) 350° C. | NA | NA | NA | 4235 | 4243 | 4140 | 4525 | 4429 | 3755 |

As shown in the destructive compressive strength data of Table II, no strength retrogression was noted. The changes in strength between the 72 hours and 30 days tests are within the standard deviation.

Example 3

A cementitious slurry was prepared by mixing neat Class G Portland cement with 67% fresh water at room temperature. To the slurry was added 35% silica flour, 15% graphite, 12.5% metakaolin, 0.3 gps fluid loss additive, commercially available from BJ Services Company LLC as FL-66L+1.4% CD-31 (a cement dispersant available from BJ Services Company LLC). The resultant slurry, 16.6 ppg, was kept with occasional agitation. The slurry of this Example and the slurry of Example 1 were then placed into cylindrical curing vessels of 1 in. diameter×2 in. long and cured at 39° C. for 120 hours in a standard API water bath. The cylinders were then removed from the water bath and placed directly in a muffle furnace at 1000° C. These conditions are believed to simulate the ignition of the coal bed in the ground and extreme conditions at the combustion front. The cured cylinders remained intact with no detectable cracking after exposure to 1000° C. (dry heat) for 72 hours.

Examples 4-8

Cementitious slurries were prepared by mixing neat Class G Portland cement with fresh water at room temperature. To the slurry was added 35% silica flour, 15% graphite, 12.5% metakaolin, surfactants as foam preventer (FP) minimizing entraining of air during mixing styrene-butadiene latex suspension as fluid loss additive (FLA), hydrated lime as accelerator, a multi liquid additive (MLA) for fluid loss control and slurry stability, and CD-31 as cement dispersant (CD). The resultant slurry was kept with occasional agitation. The formulations of the slurries are set forth in Table III:

TABLE III

| Ex. No. | Graphite/Metakaolin, % (BWOC) | Silica Flour, % (BWOC) | FP, gps | FLA, Gps | CD, gps | MLA, gps | Accelerator, gps | Density, ppg |
|---|---|---|---|---|---|---|---|---|
| 4 | 27.5 | — | 0.054 | 1.0 | | | | 15.6 |
| 5 | 27.5 | — | 0.054 | — | | | | 15.6 |
| 6 | — | 40 | 0.054 | — | | | | 15.8 |
| 7 | — | 15 | 0.054 | 0.1 | 0.1 | | 5 | 15.8 |
| 8 | — | 40 | 0.054 | | | 1.4 | 0.1 | 14.0 |

Cubes of each of the samples were then subjected to dry heat (450° C.) for 48 hours. During exposure to dry heat, physically absorbed water in the cement pores and chemically bonded water in the cement hydrate phases tried to evaporate; internal pressure was exerted within the cubes. Cement systems crack if unable to withstand such stresses. The cube of Example 8 is a low-density (14.0 ppg) design with the highest water content. Thus, it experienced the highest internal stresses, resulting in the most severe cracks. Internal pressure has also detrimentally affected the standard cement designs at 15.8 ppg (cubes of Examples 6 and 7) usually applied for temperatures above 110° C. In the contrary, the cubes of Examples 4 and 5 are 15.6 ppg, but contained the high temperature blend (graphite and metakaolin), combining a lower water content with the ability to buffer internal stresses due to suitable mechanical properties. As a result, cubes of Examples 4 and 5 exhibited no cracking or malformation.

Example 9

A cementitious slurry was prepared by mixing neat Class G Portland cement with fresh water at room temperature. To the slurry were added 15% graphite, 12.5% metakaolin, and 0.054 gps of a surfactant as foam preventer. The resultant slurry, 16.0, was kept with occasional agitation and then used to cement a liner to the wellbore in a UCG field. The coal seam was ignited and syngas was generated to fuel a power plant. A reduction in the temperature flow of the produced gas stream was noted. In particular, it was noted that the syngas was delivered to the surface 45-60° C. cooler than from substantially similar wells which had been cemented with CaP cement. Use of the high temperature cement blend yielded excellent thermal heat conductivity at reduced water content and provided a durable cement sheath at extreme temperatures at about less than half the cost of the substantially similar well cemented with the CaP cement.

From the foregoing, it will be observed that numerous variations and modifications may be effected without departing from the true spirit and scope of the novel concepts of the invention.

What is claimed is:

1. A method of producing synthesis gas by the underground gasification of coal from a coal seam comprising:
   (a) cementing casing string in a production well and an injection well which penetrates the coal seam by pumping into the wellbore a cementitious slurry having a density between from about 7.0 ppg to about 23.0 ppg, the cementitious slurry comprising a cement mix which comprises:
      (i) between from about 10 to about 70 weight percent of a cementitious material selected from the group consisting of Portland cement, pozzolan cement, fly ash cement and silica fume;
      (b) between from about 5 to about 70 weight percent of graphite; and
      (c) between from about 5 to about 70 weight percent of an aluminum silicate,
   and allowing the slurry to set to form a cement sheath in the wellbore;
   (b) igniting the coal in the coal seam;
   (c) introducing oxidant gas into the injection well; and
   (d) generating syngas as a combustion front in the coal seam and advancing the combustion front through the production well, wherein the temperature of the combustion front is greater than or equal to 800° C. and further wherein the heat from the combustion front is distributed along the cement sheath in the wellbore.

2. The method of claim 1, wherein the temperature of the syngas production stream is at least 40° C. less than the temperature of a syngas production stream produced in a production well having a casing cemented with a cementitious slurry other than that of step (a).

3. The method of claim 1, wherein the aluminum silicate is metakaolin.

4. The method of claim 1, wherein the cementitious material is a Portland cement.

5. The method of claim 4, wherein the Portland cement is a API Class A, C, G or H cement or a Type I, II, III or V ASTM construction cement.

6. The method of claim 1, wherein the cementitious slurry further comprises a strength retrogression additive.

7. The method of claim 6, wherein the strength retrogression additive is silica.

8. The method of claim 1, wherein the bottom hole static temperature of the production well at time of cement placement is less than or equal to 65° C.

9. The method of claim 8, wherein the temperature of the combustion front is greater than or equal to 1000° C.

10. The method of claim 1, wherein the temperature of the combustion front is in greater than or equal to 1000° C.

11. The method of claim 1, wherein the set cement maintains its compressive strength and does not form hot spots within the cement sheath.

12. The method of claim 1, wherein the cementitious slurry further comprises a density reducing agent or a density weighting agent.

13. A method of producing synthesis gas by the underground gasification of coal from a coal seam comprising:
   (a) pumping into the wellbore of a production well and an injection well a cementitious slurry comprising between from about 10 to about 70 weight percent of Portland cement, between from about 5 to about 70 weight percent of graphite and between from about 5 to about 70 weight percent of an aluminum silicate and allowing the slurry to set form a cement sheath in the wellbore, wherein the density of the slurry is between from about 7 to about 23 ppg;
   (b) igniting coal in the coal seam;

(c) introducing air and water through the injection well and forming a syngas; and
(d) transporting the syngas through the coal seam as a combustion front to the production well.

14. The method of claim 13, wherein the temperature of the combustion front is greater than or equal to 800° C.

15. The method of claim 14, wherein the temperature of the combustion front is greater than or equal to 1000° C.

16. The method of claim 13, wherein at least one of the following conditions prevail:
(a) the aluminum silicate is metakaolin;
(b) the bottom hole static temperature of the production well at the time of slurry placement is less than or equal to 65 C;
(c) the density of the cementitious slurry is between from 7.5 to 14 and contains from about 5 to about 150% BWOC of a density reducing agent; or
(d) the density of the cementitious slurry is between from 16.5 to 23 ppg and contains from about 5 to about 150% BWOC of a density weighting agent.

17. A method of producing synthesis gas by the underground gasification of coal from a coal seam comprising:
(a) pumping into the wellbore of a production well and an injection well a cementitious slurry comprising Portland cement, graphite and metakaolin and allowing the slurry to set form a cement sheath in the wellbore, wherein the density of the slurry is between from about 14 to about 17.0 ppg;
(b) igniting coal in the coal seam;
(c) introducing air and water through the injection well and forming a syngas;
(d) transporting the syngas through the coal seam as a combustion front to the production well
wherein the bottom hole static temperature of the production well, at the time of slurry placement, is less than or equal to 65° C. and the temperature of the combustion front is greater than or equal to 800° C.

18. A method of producing synthesis gas by the underground gasification of coal from a coal seam comprising:
(a) pumping into the wellbore of a production well and all injection, well a cement mix comprising:
 (i) graphite,
 (ii) an aluminum silicate; and
 (iii) a cementitious material comprising a mixture of two or more components selected from the group consisting of Portland cement, fly ash, slag, silica fume, gypsum, limestone and bentonite;
(b) allowing the slurry to set form a cement sheath in the wellbore, wherein the density of the slurry is between from about 7 to about 23 ppg;
(c) igniting coal in the coal seam;
(d) introducing air and water through the injection well and forming a syngas; and
(e) transporting the syngas through the coal seam as a combustion front to the production well.

19. The method of claim 18, wherein the aluminum silicate is metakaolin.

20. The method of claim 18, wherein the cement mix comprises between from about 10 to about 70 weight percent of the cementitious material; from about 7 to about 70 weight percent of graphite; and between from about 5 to about 70 weight percent of an aluminum silicate.

* * * * *